United States Patent Office 3,626,717
Patented Dec. 14, 1971

3,626,717
APPARATUS FOR CONVEYING A COLD FLUID TO AND FROM A ROTATABLE BODY
Hugh Olaf, Lorch, Stafford, England, assignor to The English Electric Company Limited, London, England
Filed Aug. 27, 1970, Ser. No. 67,463
Int. Cl. F25b *31/00*
U.S. Cl. 62—505      13 Claims

ABSTRACT OF THE DISCLOSURE

In apparatus for conveying a cold fluid to and from a rotatable body a stationary inlet tube conveys the cold fluid to a rotatable inlet tube carried on the axis of the body and a rotary seal is provided between these two tubes, cold fluid flows from the rotatable body by way of a rotatable outlet tube and means are provided for conveying the cold fluid from the rotatable outlet tube to a stationary outlet tube which bypasses the rotary seal so that the cold fluid is not heated by the rotary seal. Some cold fluid is allowed to escape from the stationary inlet tube and also from the rotatable outlet tube and this cold fluid is caused to flow up to and around the rotary seal so thermally isolating the seal from the flow paths of the cold fluid.

---

This invention relates to apparatus for conveying a cold fluid to and from a rotatable body.

Present techniques of using very cold fluids, such for example, as liquid helium or very cold gaseous helium require the provision of considerable refrigeration and it is therefore advantageous to minimize heat leaks in apparatus using such cold fluids.

The apparatus disclosed in this specification was developed specifically for conveying very cold helium to and from the rotor of a dynamoelectric machine for the purpose of cooling the rotor, but the apparatus is not limited to this particular application.

According to the present invention there is provided apparatus for conveying a cold fluid to and from a rotatable body including, a stationary inlet tube for conveying the cold fluid towards the rotatable body,
a rotatable inlet tube carried on the axis of the rotatable body, the two inlet tubes being arranged coaxially and disposed end to end, with a space therebetween,
a rotary seal between the two inlet tubes,
a rotatable outlet tube for the cold fluid carried on the axis of the rotatable body and disposed about the rotatable inlet tube,
a stationary outlet tube for conveying the cold fluid away from the rotatable body and disposed about the stationary inlet tube, and
means for conveying cold fluid from the rotatable outlet tube to the stationary outlet tube in an exhaust path which bypasses the rotary seal so that the cold fluid is not heated thereby.

Figure 1:
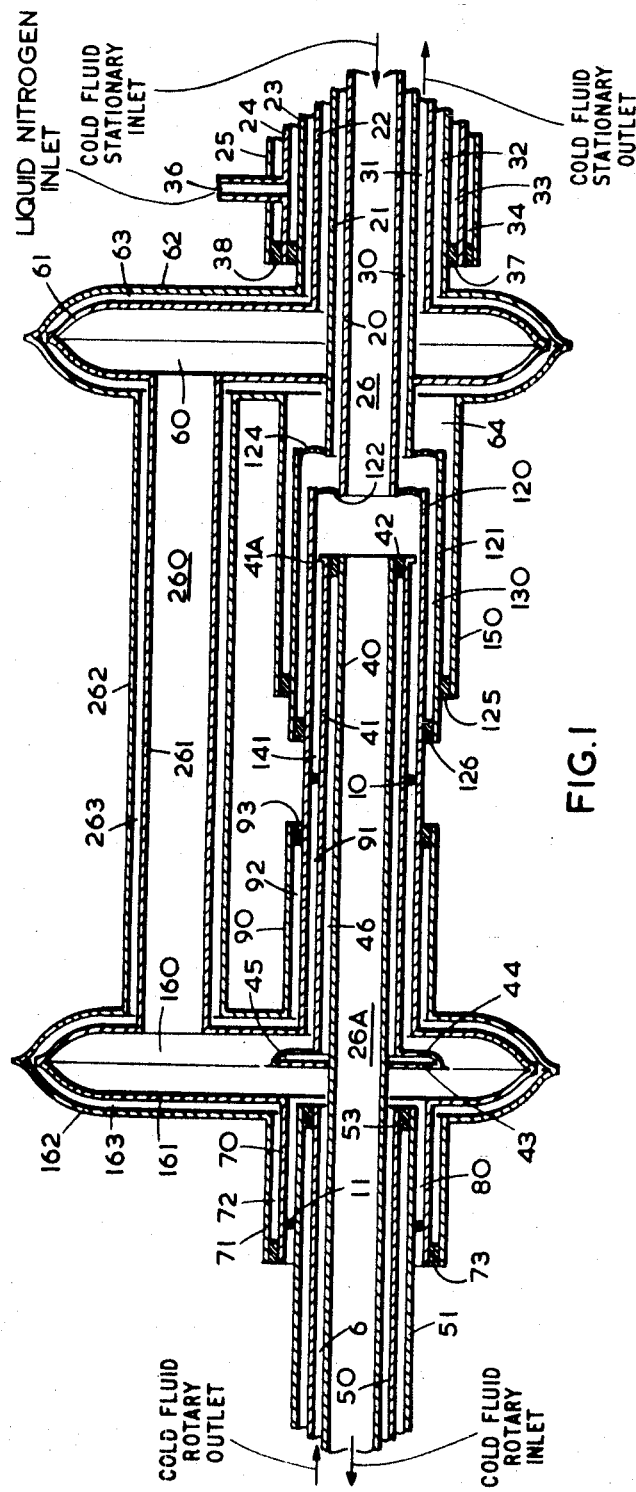
Figure 2:
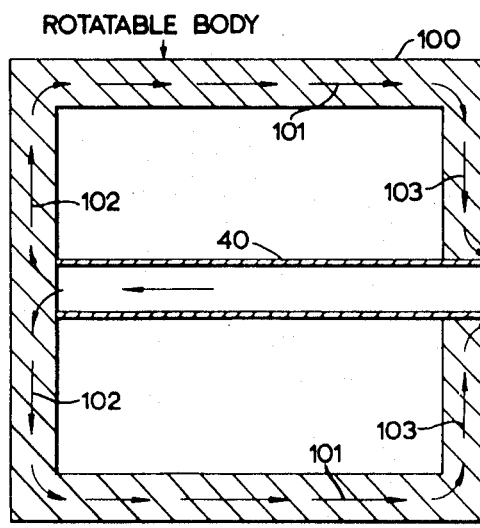
Figure 3:
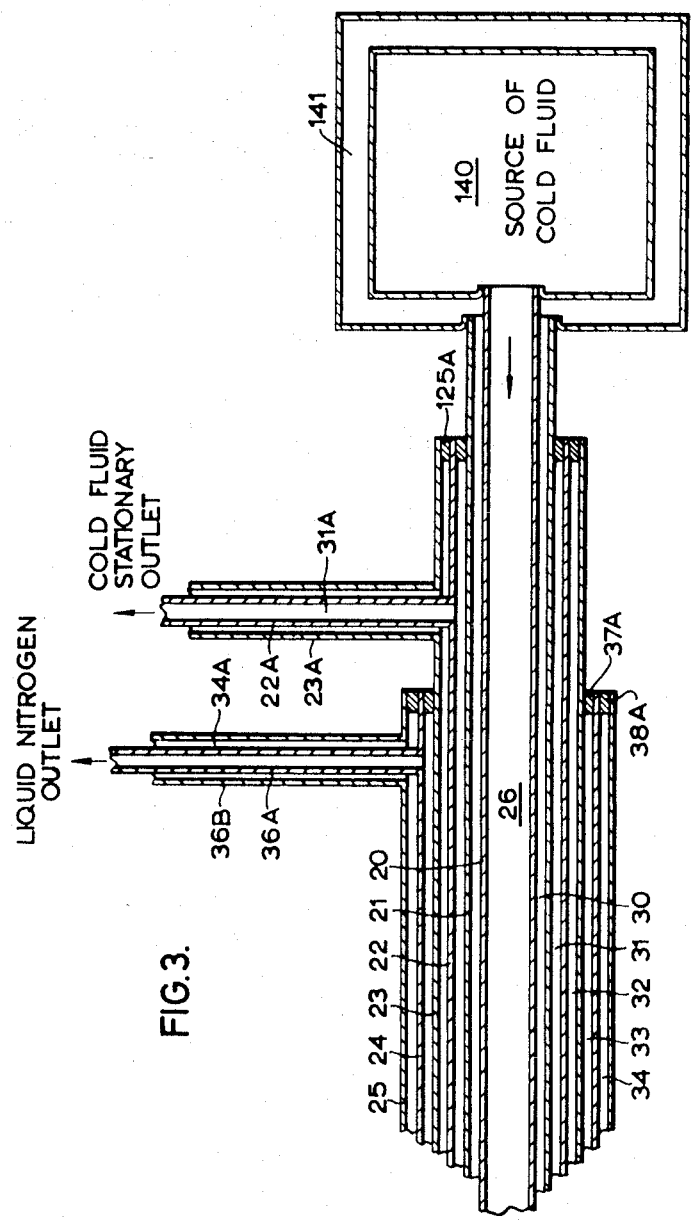

In order that the invention may be better understood one embodiment of apparatus for conveying a cold fluid to and from a rotatable body will now be described, by way of example, with reference to the accompanying diagrammatic drawings in which:

FIGS. 1, 2 and 3 together show the apparatus. FIG. 1 is a section through the apparatus according to the invention, FIG. 2 diagrammatically illustrates a rotatable body to which the cold fluid can be supplied, FIG. 3 is a section of the end of the apparatus of FIG. 1 adjacent a source of the cold fluid, and FIGS. 4, 5, 6 and 7 show modifications of the apparatus.

FIG. 1 is not shown to scale. The length of the apparatus between the two chambers 60 and 160, described later, would be much greater than shown in FIG. 1. However, breaks in FIG. 1, to help indicate this greater length, have not been included as this could make FIG. 1 more difficult to understand.

The apparatus of FIGS. 1 and 3 comprises the following parts. Six coaxially arranged stationary tubes 20 to 25 as follows:

Tube 20, a stationary inlet tube;
Tube 21, a sixth stationary tube;
Tube 22, a stationary outlet tube;
Tube 23, a seventh stationary tube;
Tubes 24 and 25, eighth and ninth stationary tubes respectively.

These tubes define five passages as follows:

Passages 26, a central stationary inlet passage;
Passage 30, a first isolating passage;
Passage 31, a first outlet passage;
Passages 32, 33 and 34, second, third and fourth isolating passages respectively.

The passage 26 is connected to a source of cold fluid 140 (FIG. 3) and the passage 31 is connected to means (not shown) for collecting exhausted cold fluid.

FIG. 3 shows a passage 31A by which the cold fluid is exhausted. This passage is formed by a tube 23A which connects with the tube 23 and so communicates with the passage 31. The tube 23A is surrounded by a tube 22A which defines an extension of the passage 32 and these passages are evacuated.

The other passages are sealed at both ends as follows:
Passage 30 is sealed by a first sealing ring 126 (FIG. 1) and may, if desired, be sealed into an enclosure 141 surrounding the source of cold fluid 140 (FIG. 3), or it may be sealed by a second sealing ring (not shown) near the source of cold fluid.

Passage 32 is sealed by a sealing ring 125 (FIG. 1) and by a fourth sealing ring 125A (FIG. 3).

Passage 33 is sealed by a fifth sealing ring 37 (FIG. 1) and by a sixth sealing ring 37A (FIG. 3).

Passage 34 is sealed by a seventh sealing ring 38 (FIG. 1) and by an eighth sealing ring 38A (FIG. 3).

The passage 33 communicates with a tube 36 (FIG. 1) at one end of the passage and the other end of the passage 33 communicates with a tube 36A. A cold fluid such, for example, as liquid nitrogen can be circulated through the passage 33 for cooling purposes. The passage 34 surrounding the passage is evacuated as is the passage 34A (FIG. 3) surrounding the tube 36A and defined by a tube 36B communicating with the outer tube 25.

Between the inner end of the tube 20 (FIG. 1) and the seal 126 the tube 20 is connected to an eleventh stationary larger diameter tube 120 by a dished flange 122. Between the inner end of the tube 21 (FIG. 1) and the seal 125 the tube 21 is connected to a twelfth stationary larger diameter tube 121 by a dished flange 124.

The seal 126 (FIG. 1) is between tubes 120 and 121. The seal 125 (FIG. 1) is between the tube 21 and a thirteenth stationary tube 150, and the seal 125A (FIG. 3) is between the tubes 22 and 23.

The annular spaces between the tubes 150 and 121 and 121 and 120 constitute fifth and sixth stationary annular passages indicated at 64 and 130 respectively.

A first chamber 60 having inner and outer walls 61 and 62 is disposed about the tubes 20 and 21 and the inside of the chamber 60 communicates with the annular passage 31. The next outer annular passage 32 communicates with the space 63 between the chamber walls 61 and 62, and the axially outer end of the tube 150 is secured in an aperture in the outer wall 62 of the chamber 60. The spaces 64, 63 and 32 thus all communicate and are evacuated.

On the lefthand side of FIG. 1 are shown third and fourth stationary tubes 70 and 71 respectively. These tubes define a seventh annular passage 72 which is sealed by a ring 73. The other ends of these tubes 70 and 71 are sealed respectively to the inner and outer walls 161 and 162 of a second double walled chamber 160. The space between the walls of the chamber 160 is indicated at 163 and this space connects with an annular passage 92 formed by a fourteenth tube 90 which is secured in an aperture in the wall 162 and sealed by a ring 93 to the tube 120.

A passage 260 is provided by a pipe 261 which connects the chambers 60 and 160 and a second pipe 262 which is disposed about the pipe 261 connects the space 163 about the chamber 160 with the space 63 about the chamber 60. The annular space between pipes 261 and 262 is indicated at 263. The stationary parts of the apparatus described above define a seventh annular space 72, an eighth annular passage 92, space 163, annular space 263, space 63, second annular passage 32 and fifth annular space 64 all communicating and all of which are evacuated and sealed. The sealing ring 126 (FIG. 1) between the tubes 120 and 121 seals the sixth passage 130 which communicates with the first annular passage 30 and these spaces are also evacuated.

The walls 61 and 62 of chamber 60 are sufficiently flexible to accommodate for differential thermal contraction of tubes 22 and 23 respectively and of tubes 121 and 150 respectively. Similarly the walls 161 and 162 of chamber 160 are sufficiently flexible to accommodate for differential thermal contraction of tubes 70 and 71 respectively and of tubes 120 and 90 respectively.

The rotating parts of the apparatus are shown in FIG. 2 and in the lefthand side of FIG. 1. These parts comprise a first rotatable inlet tube 40 which is carried on the axis of the rotatable body 100 (FIG. 2) and defines a rotatable inlet passage 26A. This tube carries a tenth rotatable tube 41 and the inner ends of these tubes are sealed by a ring 42 (FIG. 1). The other end of the tube 41 is sealed to the outer face of the tube 40 by a flat disc 43 and a dished disc 44. The flat disc 43 is sealed to the tube 40 at its inner periphery, the inner periphery of the dished disc 44 is sealed to the tube 41, and the outer peripheries of the two discs are sealed together. The parts 40 to 44 thus define first and second rotatable chambers 45 and 46 and these chambers communicate and are evacuated.

The discs 43 and 44 are sufficiently flexible to accommodate for differential thermal contraction of the tubes 40 and 41.

A rotatable outlet tube 50 is carried by the rotatable body 100 (FIG. 2) about the first rotatable inlet tube 40 and rotates therewith. The tube 50 is surrounded by a fifth rotatable tube 51 which is sealed to the tube 50 by a ring as shown at 53, at their other ends (FIG. 2) the tubes 50 and 51 are sealed by means not shown, but which allow for differential thermal contraction. The first rotatable outlet path, between tubes 40 and 50, is designated 6 and this communicates with the chamber 160. This embodiment of the invention is intended for conditions where the temperature of the fluid in the outlet path 6 is close to that of the incoming fluid in the inlet tube 40 and thermal isolation between the tube 40 and path 6 is not required.

A rotary seal seals the stationary tube 120 to the rotatable tube 41 and this seal is diagrammatically shown as an O ring 10. A similar seal shown as an O ring 11 provides a seal between the tubes 51 and 70 and the annular space between these tubes is indicated at 80. This space communicates with the chamber 160.

In operation cold fluid enters the passage 26A in the rotatable tube 40 through the stationary passage 26. The fluid can be pumped into the passages 26 and 26A or drawn in by pumping action of the rotatable body. At the end of the tube 20 some of the cold fluid will flow up to the seal 10 in the annular space 141 between tubes 41 and 120 and this fluid will tend to remain static so thermally isolating the seal 10 from the fluid entering the passage 26A in the tube 40.

A seal such as the seal 10 necessarily becomes warm due to the heat generated by friction at the rubbing surfaces. Heat thus flows from the warm seal 10 to the open end of the tube 40 along the surrounding metal of the tube 41. Disturbance of, and conduction in the fluid in the annular space 141 also allows heat to flow from the warm seal 10 to the open end of the tube 40. This heat flow may be reduced to a satisfactory low amount by making the space 141 as long and as narrow as necessary.

Figure 6:
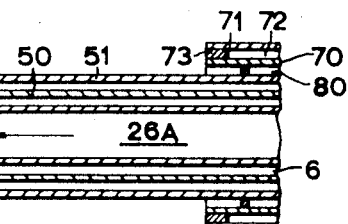
Figure 6:
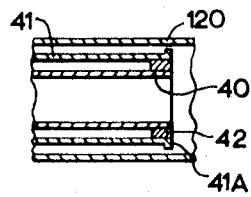

The tendency of the cold and warm fluids to mix due to gravitational forces can be counteracted by shaping the tube 41 and/or 120. FIG. 6 shows the end of the tube 41 to have an end rim 41A of greater diameter than the rest of the tube 41. The colder and so heavier fluid will preferentially rotate in the region of greater diameter.

Figure 7:
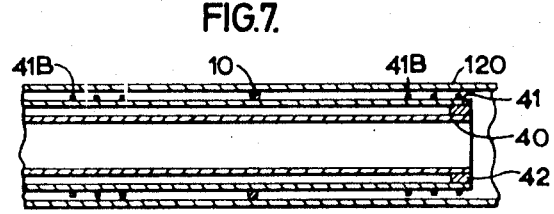

FIG. 7 shows how the same result can be achieved by fitting thin annular baffles 41B. These baffles can be fitted on both sides of the seal 10, as shown, or can be fitted near the open end of the tube 40 only. The evacuated space 46 between the tubes 40 and 41 also thermally isolates the tube 40 from the seal 10. The evacuated space 130 isolates the fluid in space 141 from parts near room temperature and tubes 120 and 121 are made long enough to limit satisfactorily heat conducted in their walls to the inlet flow path 26 and the chambers 60.

Cold fluid from the rotatable body flows out of the path 6 to enter the chamber 160 and the two annular spaces 80 and 91. In the spaces 80 and 91 the fluid flows up to the seals 11 and 10 respectively where it tends to remain static thus isolating both seals from the chamber 160. The space 80 is also made long enough to limit heat conducted in the walls of tubes 51 and 70 from the seal 11 to the main exhaust path. Similarly, the length of space 91 limits heat conducted from seal 10 to the main exhaust path. It will be seen that the exhaust path bypasses the seal 10 and is completely surrounded and isolated by the evacuated spaces 72, 163, 263, 63 and 32, and is also isolated from the passage 26 by the evacuated space 30. The passage 32 is surrounded by the passage 33 which is filled with a cold fluid, such as liquid nitrogen through the tube 36, and the path 32 is in turn surrounded by the space 34 which is evacuated. The tube 150 closing evacuated space 64 is made long enough to limit heat conducted in its wall and the walls of tubes 121 and 21 to the main exhaust path.

The flanges 43 and 44 allow for differential thermal contraction as do the dish shaped walls 61, 62 and 161, 162 of the chambers 60 and 160. The flanges 122, 124, 43 and 44 and the walls 61, 62 and 161, 162 of the chambers 60 and 160 are made so that the flanges can be edge-welded to the tubes and the walls of the chambers can similarly be edge-welded together and to the tubes.

FIG. 2 shows the rotatable body 100 with the tube 40 extending into the body for substantially the whole length thereof. Cold fluid flows along the rotatable inlet passage 26A to the lefthand end of the body, then in radial paths indicated by arrows 102 to the periphery of the body. At the periphery the cold fluid flows in axial paths indicated by arrows 101 and then into further radial paths indicated by arrows 103. Near the axis of the body the cold fluid flows into the rotatable outlet path 6 between the tubes 40 and 50.

FIG. 3 diagrammatically shows the input/output end of the apparatus adjacent the source of cold fluid 140. The source 140 will normally be a refrigerating plant and the cold fluid flowing out of the apparatus along the first stationary outlet passage 31 can be fed back, either directly or indirectly, into the refrigerating plant.

Figure 4:
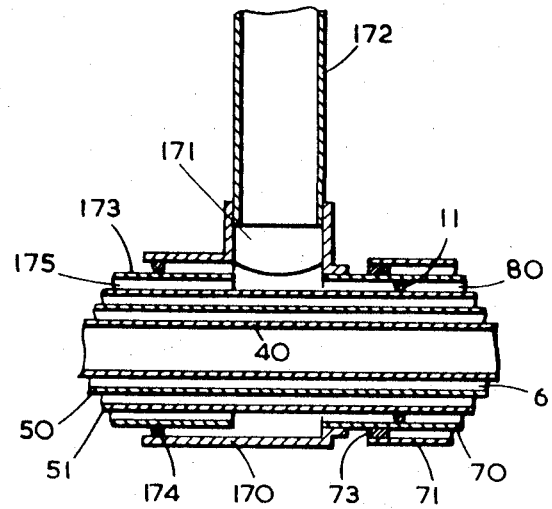

FIG. 4 shows a modification of FIG. 1 suitable for use where some of the cold fluid being exhausted from the rotatable body is at a higher temperature than that being exhausted along the path 6. In this arrangement the stationary tube 70 is extended beyond the sealing ring 11 and is joined to a stationary tubular member 170. This member has an aperture 171 into which is fitted an exhaust pipe 172.

A sixth rotatable tube 173 is mounted on the rotatable body about the tube 51 and the space 175 between the tubes 173 and 51 provides a rotatable exhaust path for the relatively warm cold fluid. Then end of the tube 173 projects into the member 170 and a rotatable seal is provided between the tube and the member. This seal is diagrammatically shown as an O ring 174. Fluid flowing from the space 175 enters the member 170 and is exhausted via pipe 172.

Figure 5:
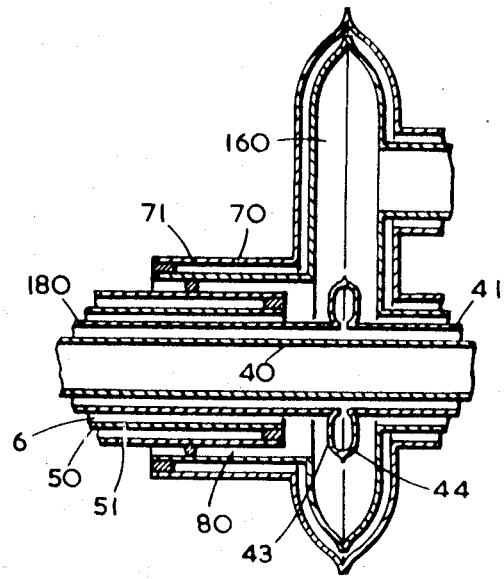

FIG. 5 shows a modification of the apparatus which is suitable for use where the cold fluid exhausted along the path 6 is too warm to be allowed to flow adjacent the inlet tube 40, but still sufficiently cold to be used in the stationary outlet path 31 for the purpose of preventing appreciable heat flow into the stationary inlet path 26.

In this arrangement an additional rotatable tube 180 is included between the tubes 40 and 50 and the space between the tubes 40 and 180 is evacuated. Since the space between the tubes 40 and 41 is also evacuated this space may communicate with the evacuated space between tube 40 and the additional tube 180. This allows the tube 180 to be made as a continuation of tube 41 and the flanges 43 and 44 omitted, or the flanges can be of the modified shape shown in FIG. 3. In FIG. 5 the flanges 43 and 44 are shown as being of similar shape for convenience of manufacture and only serve to connect the tubes 41 and 180 end-to-end, and to allow them to move relatively during thermal contraction.

The above described apparatus is particularly suitable for supplying liquid helium to a rotatable body and exhausting helium therefrom. The helium being exhausted through the path 6, 160, 260, 60 and 31 may be gaseous and its temperature on entering the passage 31 could be below that of the liquid helium flowing in the inlet passage 26. This could be the case where the gaseous helium is pumped out through the passage 31 so that it is at a low pressure and thus at a low temperature.

In its use for conveying helium, apparatus according to the present invention is of particular use in a super-cooled dynamo electric machine such as that described in our copending patent application of Hugh Olaf Lorch for Dynamo Electric Machines, Ser. No. 848,521, filed Aug. 8, 1969.

I claim:

1. Apparatus for conveying a cold fluid to and from a rotatable body including,
   a stationary inlet tube for conveying the cold fluid towards the rotatable body,
   a rotatable inlet tube carried on the axis of the rotatable body, the two inlet tubes being arranged coaxially and disposed end to end, with a space therebetween,
   a rotary seal between the two inlet tubes,
   a rotatable outlet tube for the cold fluid carried on the axis of the rotatable body and disposed about the rotatable inlet tube,
   a stationary outlet tube for conveying the cold fluid away from the rotatable body and disposed about the stationary inlet tube, and
   means for conveying cold fluid from the rotatable outlet tube to the stationary outlet tube in an exhaust path which bypasses the rotary seal so that the cold fluid is not heated thereby.

2. Apparatus according to claim 1 in which the means for conveying cold fluid from the rotatable outlet tube to the stationary outlet tube includes,
   a first chamber disposed about the stationary inlet and communicating with the stationary outlet tube,
   the first chamber having an inner flexible wall and an outer flexible wall, the two walls being spaced apart,
   a second chamber disposed about the rotatable inlet tube and communicating with the rotatable outlet tube,
   the second chamber having an inner flexible wall and an outer flexible wall, the two walls being spaced apart, and
   means remote from the rotary seal for conveying fluid from the second chamber to the first chamber comprising,
   the arrangement of the flexible walled chambers being such as to accommodate for differential thermal contraction of parts of the apparatus associated with the chambers,
   a first pipe having one end sealed to the inner wall of one chamber and the other end sealed to the inner wall of the other chamber,
   a second pipe disposed about and spaced from the first pipe and having one end sealed to the outer wall of one chamber and the other end to the outer wall of the other chamber, and,
   means for sealing the space between the inner and outer walls of the chambers and the space between the first and second pipes so that these spaces can be evacuated.

3. Apparatus according to claim 2 including,
   a second rotary seal between the third tubular member and the rotatable outlet tube,
   a fifth rotatable tubular member carried on the axis of the rotatable body and disposed about and spaced from the rotatable outlet tube,
   means for sealing the ends of the fifth rotatable tubular member to the rotatable outlet tube so that the space between these two tubes can be evacuated,
   a third stationary tubular member extending about and spaced from the fifth rotatable tubular member,
   a fourth stationary tubular member disposed about and spaced from the third tubular member,
   means for sealing together the outer ends of the third and fourth tubular members so that the space between these members can be evacuated, and
   a second rotary seal sealing the space between the third tubular member and the fourth rotatable tubular member.

4. Apparatus according to claim 3 in which some of the cold fluid flowing from the rotatable body is exhausted through a second outlet path and does not flow through said exhaust path, including
   a sixth rotatable tubular member disposed about the fifth rotatable tubular member and spaced therefrom, and
   means adjacent the end of the sixth rotatable tubular member for conducting away fluid exhausted therefrom.

5. Apparatus according to claim 3 in which the space between the third tubular member and the fifth rotatable tubular member is elongated and has one end communicating with the end of the rotatable outlet tube and the space within the second chamber,
   the second rotary seal being disposed adjacent the other end of the third tubular member remote from the second chamber and remote from the open end of the rotatable outlet tube, so that cold fluid at the end of the rotatable outlet tube is not heated by heat generated by the second rotary seal.

6. Apparatus according to claim 5 including,
   a sixth stationary tubular member surrounding and spaced from the stationary inlet tube,
   the sixth stationary tubular member being secured to an inner wall of the first chamber and
   means for sealing the ends of the sixth stationary tube to the stationary inlet tube so that the space between these two tubes can be evacuated, the stationary outlet tube surrounding the sixth stationary tubular member and being spaced therefrom, and having one end secured to an aperture in the inner wall of the first chamber.

7. Apparatus according to claim 6 including, a seventh stationary tubular member surrounding and spaced from the stationary outlet tube, one end of the seventh stationary tubular member being secured to an aperture in the outer wall of the first chamber, means for sealing together the free ends of the seventh tubular member and the stationary outlet tube so that the space between the stationary outlet tube and the seventh tubular member can be evacuated, an eighth tubular member surrounding and spaced from the seventh tubular member, a ninth tubular member surrounding and spaced from the eighth tubular member, means for sealing the ends of the eighth tubular member to the ends of the seventh tubular member, means for sealing the two ends of the ninth tubular member to the ends of the eighth tubular member so that the space between these two tubular members can be evacuated, and means for enabling a cold fluid to be circulated through the space between the seventh and eighth tubular members.

8. Apparatus according to claim 7 in which, the stationary inlet tube extends through the first chamber and the rotatable inlet tube extends through the second chamber, including a tenth rotatable tubular member disposed about and spaced from the rotatable inlet tube, this tenth rotatable tubular member extending from the free end of the rotatable inlet tube to at least as far as the second chamber, means sealing the space between the rotatable outlet tube and the tenth rotatable tubular member so that the said space can be evacuated, a flange secured to the end of the stationary inlet tube opposite to the end of the rotatable inlet tube, an eleventh tubular member surrounding and spaced from the tenth rotatable tubular member, one end of the tubular member being secured to the outer periphery of the flange, the other end of the eleventh tubular member being secured to an aperture in the inner wall of the second chamber, the rotary seal effecting a seal between the tenth rotatable tubular member and the eleventh tubular member, with the annular spaces between the seal and the chamber and the end of the rotatable inlet tube respectively being elongated, so that cold fluid flowing through the apparatus is not heated by heat generated by the first rotary seal.

9. Apparatus according to claim 8 in which the outer diameter of the tenth rotatable tubular member remote from the seal is enlarged so that the denser cold fluid tends to remain in the region of the enlarged diameter part of the tenth rotatable tubular member.

10. Apparatus according to claim 8 including, a plurality of annular washers secured to the outer surface of the tubular member, these washers being disposed along part of the length of the tubular member on at least one side of the seal and extending towards but not touching the inner surface of the eleventh stationary tubular member, so that the denser cold fluid tends to remain in the region of the washers.

11. Apparatus according to claim 8 in which the sixth stationary tubular member extends through the first chamber, including a second flange secured to the inner end of the stationary tubular member, a twelfth stationary tubular member disposed about part of the eleventh stationary tubular member and spaced therefrom, one end of the twelfth stationary tubular member being secured to the periphery of the second flange, means for sealing the other end of the twelfth stationary tubular member to the eleventh stationary tubular member adjacent the first rotatable seal, so that the space enclosed by the sixth stationary tubular member, the second flange, and the eleventh stationary tubular member can be evacuated, a thirteenth stationary tubular member disposed about part of the twelfth stationary tubular member and spaced therefrom, one end of the thirteenth stationary tubular member being secured to an aperture in the outer wall of the first chamber, and means for sealing the other end of the thirteenth stationary tubular member to the twelfth stationary tubular member adjacent the end thereof, so that the space enclosed by the thirteenth tubular member can be evacuated.

12. Apparatus according to claim 8 including, a fourteenth stationary tubular member disposed about part of the eleventh stationary tubular member and spaced therefrom, one end of the fourteenth stationary tubular member being secured to an aperture in the outer wall of the second chamber, and means for sealing the other end of the fourteenth stationary tubular member to the eleventh stationary tubular member adjacent the rotary seal, so that the space enclosed by the fourteenth tubular member can be evacuated.

13. Apparatus according to claim 8 in which the tenth rotatable tubular member extends into the second chamber, including a fifteenth rotatable tubular member disposed about and spaced from the rotatable inlet tube, the fifteenth rotatable tubular member being also spaced from the surrounding rotatable outlet tube and having one end extending into the second chamber, and means for securing together the adjacent ends of the tenth and fifteenth rotatable tubular members, so that the other end of the fifteenth rotatable tubular member can be sealed to the other end of the rotatable inlet tube whereby an evacuated space can be provided about the rotatable inlet tube.

References Cited

UNITED STATES PATENTS

| | | | |
|---|---|---|---|
| 3,241,331 | 3/1966 | Endress et al. | 62—505 X |
| 3,348,490 | 10/1967 | Katz et al. | 310—61 X |
| 3,388,559 | 6/1968 | Johnson | 62—505 X |
| 3,447,003 | 5/1969 | Cooper et al. | 310—54 |
| 3,571,634 | 3/1971 | Sato et al. | 310—54 |

MEYER PEELIN, Primary Examiner

R. C. CAPOSSELA, Assistant Examiner

U.S. Cl. X.R.

62—52, 55; 310—54, 61